Patented Feb. 1, 1949

2,460,705

UNITED STATES PATENT OFFICE 2,460,705

CHLORINOLYSIS

Earl T. McBee and Ogden R. Pierce, La Fayette, Ind., assignors to Purdue Research Foundation, La Fayette, Ind., a corporation of Indiana No Drawing. Application July 18, 1946, Serial No. 684,533

7 Claims. (Cl. 204—163)

This invention relates to a process for the preparation of perchloro-n-alkyl-substituted aromatic hydrocarbons. The invention further relates to a method for the controlled chlorinolysis of aromatic hydrocarbons substituted with one or more branched-chain groups to produce the corresponding n-alkyl-substituted aromatic compound, perchlorinated in all side chains which are present. By "perchlorinated" is meant that all hydrogen atoms in the side chain are replaced with chlorine.

An object of the invention is the provision of a process for the production of perchloro-n-alkyl-substituted aromatic compounds from aromatic hydrocarbons containing one or more isopropyl groups. A further object is the provision of a process for the controlled chlorinolysis of aromatic hydrocarbons containing one or more isopropyl groups. A specific object is the provision of a process for the production of 1-pentachloroethyl-4-(trichloromethyl)benzene from para-cymene. Another specific object of the invention is the provision of a process for the production of bis(pentachloroethyl)benzene from diisopropylbenzene. Other objects of the invention will become apparent hereinafter.

The problem of chlorinolysis is of considerable significance in the chlorination of organic compounds, especially branched-chain hydrocarbons. In some cases this chlorinolysis has been unimportant, while in other instances it has proven an obstacle of sizeable proportion, to be avoided if at all possible. In our search for a new method of preparing chlorinated alkylbenzenes, we have now discovered that the chlorinolysis factor may be used to eliminate carbon atoms from a specific type of branched-chain alkyl-substituted aromatic hydrocarbon, i. e., those aromatic hydrocarbons substituted with one or more isopropyl groups, to yield, due to concurrent chlorination, the corresponding perchloro-n-alkyl-substituted aromatic compound containing pentachloroethyl groups in the same quantity as isopropyl groups are present in the starting aromatic hydrocarbon.

We are now able, by virtue of the chlorinolysis factor, to eliminate steps previously necessary in preparing the perchloro-n-alkyl-substituted aromatic compound. Thus, if the branched-chain alkyl-substituted hydrocarbon is commercially available, the step of synthesizing 1-ethyl-4-methylbenzene, for example, prior to chlorinating the same, is no longer necessary, as by chlorinolysis of para-cymene the perchloro-n-alkyl substituted aromatic compound is produced in one step.

In practising our invention, the reactants may be contacted in any suitable manner. We prefer to place the branched-chain alkyl-substituted aromatic hydrocarbon, e. g., para-cymene, diisopropylbenzene, ethylisopropylbenzene, triisopropylbenzene, et cetera, in a Pyrex chlorination tube, equipped with a reflux condenser, gas-dispersion disc and water-cooled glass spiral within the reaction zone for temperature control. The reactor may be illuminated in any suitable manner. Our reactor was fitted with two fluorescent lights for illumination purposes. Chlorine may be passed into the reaction zone, preferably at a low temperature of about 20 degrees centigrade or lower and in a finely diffuse state. The amount of chlorine used is in excess of that theoretically required to perchlorinate the alkyl side chains. The temperature may be raised as chlorination proceeds, usually not exceeding substantially 140 degrees centigrade at the end of the reaction period, about 70–120 hours. The extent of chlorinolysis was found to be proportional, in every instance, to the temperature and reaction time employed. It was evident that, in most cases, chlorinolysis began after the first 50–60 hours at the temperatures utilized. At the end of about 100 hours, no further chlorinolysis was discernible and the reaction was usually stopped. The contents of the reaction tube were crystallized from a 1:1 mixture of benzene-methanol and the products were identified as the perchloro-n-alkyl-substituted aromatic compound and carbon tetrachloride. When more than one alkyl substituent is present in the molecule, both will be perchlorinated, but only in the isopropyl group does chlorinolysis occur to any extent.

In our experiments to determine the various applications of the present invention, we have found that the reaction is much more efficient when applied to 1-4 substituted aromatic compounds, e. g., para-cymene, and when none of the alkyl substituents contain in excess of three carbon atoms.

Thus the preferred embodiment of our invention resides in the treatment of such aromatic compounds as are substituted with alkyl groups in the 1-4 positions and which contain one or more isopropyl groups in these positions. The preferred embodiment of the invention allows production of exceedingly high yields of the desired product. However, the reaction may be conducted with any benzene compound containing from 1 to 3 alkyl substituents, each substituent containing from 1 to 5 carbon atoms, inclusive, at least one substituent group being the isopropyl group, to prepare the corresponding perchloro-n-alkyl-substituted benzene compound.

While above temperatures, 20-150 degrees centigrade, illustrate the optimum range for our invention, it is to be understood that other conditions may be employed. We have found our process to be satisfactory at temperatures as high as 200 degrees centigrade, reaction time varying according to the temperature at which the process is conducted as well as to a certain degree with the compound undergoing reaction.

The following examples illustrate several ways in which the principle of our invention may be applied, but are not to be construed as limiting.

Example 1

Five hundred grams (approximately 3.7 moles) of para-cymene was placed in a glass chlorination tube equipped with a reflux condenser, gas-dispersion disc, and a glass, cooling spiral located within the reaction zone. Two forty-watt fluorescent lamps, placed alongside of the tube, furnished illumination for the reaction. Chlorine was passed into the reaction zone at the rate of two moles per hour at a temperature of 20 degrees centigrade. This temperature was maintained for the first 30 hours of chlorination, whereafter the reaction mixture was heated at 100 degrees centigrade for 24 hours and finally at 140 degrees centigrade for 18 hours. At this time it was apparent that a quantity of carbon tetrachloride was refluxing. The total amount of chlorine was 144 moles, an excess over that required to perchlorinate the alkyl groups, and the total chlorination period allowed was 72 hours, at the end of which time the contents of the tube were removed, liquid and crystalline products were separated, and the crystalline portion recrystallized from a 1:1 mixture of benzene and methanol. Six hundred grams of a white crystalline solid, melting at 115 degrees centigrade and corresponding to 1-pentachloroethyl-4-(trichloromethyl)benzene, was obtained. 1-pentachloroethyl-4-(trichloromethyl)benzene contained 71.7 per cent chlorine, checking exactly the theoretical chlorine content for the compound. The yield and conversion in this reaction were 40 per cent.

Example 2

This experiment was conducted in an effort to increase the yield of 1-pentachloroethyl-4-(trichloromethyl)benzene by chlorinolysis of para-cymene. A maximum reaction temperature of 140 degrees centigrade was maintained for 48 hours, the total reaction time being 120 hours. It was noted that chlorinolysis ended after about 110 hours of chlorination. Twelve hundred grams of 1-pentachloroethyl-4-(trichloromethyl)benzene was obtained, representing a yield and conversion of 80 per cent.

Example 3

After the manner of the preceding examples, three moles of diisopropylbenzene was treated with chlorine at 160 degrees centigrade for 48 hours. The amount of chlorine used was in excess of that required to perchlorinate the alkyl side chains. The products were poured into an equal volume of 1:1 methanol and benzene, and the solid material was recrystallized from the same solvent. The white solid which was obtained melted at 247 degrees centigrade and contained 74.4 per cent chlorine, corresponding to bis(pentachloroethyl)benzene, which contains 74.2 per cent chlorine and melts at 247 degrees centigrade. The yield and conversion was 27 per cent of the theoretical.

Within the broad application of our invention is included the chlorinolysis of many other aromatic compounds containing at least one isopropyl group, in each case to produce the corresponding perchloro-n-alkyl-substituted aromatic compounds. Representative compounds which may be within the scope of the present invention are polyalkyl substituted aromatic heterocycles, such as pyridine or quinoline, which contain at least one isopropyl group; polyalkyl-substituted naphthalenes and other similar aromatic fused-ring systems containing at least one isopropyl group; polyalkyl substituted biphenyl, terphenyl and other similar aromatic polycarbocyclic non-fused ring systems containing at least one isopropyl substituent, and any other polyalkyl-substituted aromatic nucleus containing at least one isopropyl substituent and no functional group or groups. It is, of course, desired to include the chlorinolysis of these compounds within the scope of the appended claims.

Although, in most instances, chlorinolysis begins after about 50-60 hours at about 100-140 degrees centigrade, it is possible in some instances, by increasing the temperature, to induce chlorinolysis after a reaction period of not more than about 30 hours. However, higher temperatures may introduce undesirable burning and tar-formation, and this procedure involving higher temperatures is not ordinarily recommended.

We claim:

1. In a method for the conversion of an isopropyl group on an aromatic ring containing from one to three alkyl substituents, each substituent containing from one to five carbon atoms inclusive, at least one of which is the isopropyl group, to a pentachloroethyl group, the step of reacting the aromatic compound together with chlorine, the total amount of chlorine being in excess of that theoretically required to perchlorinate all of the alkyl substituents, in the presence of actinic light, at a reaction temperature between about 20 and 200 degrees centigrade for a period of time sufficient to cause chlorinolysis of the isopropyl substituent to a pentachloroethyl group and to perchlorinate any other alkyl groups, and separating from the reaction product the corresponding perchloroalkyl-substituted aromatic compound wherein an isopropyl group has been converted to a pentachloroethyl group.

2. In a method for the conversion of an isopropyl group on a benzene ring containing from one to three alkyl substituents, each substituent containing from one to five carbon atoms inclusive, at least one of which is the isopropyl group, to a pentachloroethyl group, the step of reacting the benzene compound together with chlorine, the total amount of chlorine being in excess of that theoretically required to perchlorinate all of the alkyl substituents, in the presence of actinic light, at a reaction temperature between about 20 and 200 degrees centigrade for a period of time in excess of about 30 hours and sufficient to cause chlorinolysis of the isopropyl substituent to a pentachloroethyl group and to perchlorinate any other alkyl groups, and separating from the reaction product the corresponding perchloro-alkyl-substituted benzene wherein an isopropyl group has been converted to a pentachloroethyl group.

3. In a method for the conversion of an isopropyl group on a benzene ring having alkyl groups of from one to three carbon atoms, inclusive, in each of the 1 and 4 positions, at least one of which is the isopropyl group, to a pentachloroethyl group, the step of reacting the benzene compound together with chlorine, the total amount of chlorine being in excess of that theoretically required to perchlorinate all of the alkyl substituents, in the presence of actinic light, at a reaction temperature between about 20 and 200 degrees centigrade for a period of time in excess of about 30 hours and sufficient to cause chlorinolysis of the isopropyl substituents to a pentachloroethyl group and to perchlorinate any other alkyl group present, and separating from the reaction product the corresponding perchloroalkyl-substituted benzene wherein any isopropyl groups have been converted to a pentachloroethyl group.

4. In a method for the conversion of paracymene to 1-pentachloroethyl-4-(trichloromethyl)-benzene, the step of reacting the paracymene together with chlorine, the total amount of chlorine being in excess of that theoretically required to perchlorinate the alkyl substituents, in the presence of actinic light, at a reaction temperature between about 20 and 200 degrees centigrade, for a period of time in excess of about 30 hours and sufficient to cause chlorinolysis of the isopropyl substituent to a pentachloroethyl group and to perchlorinate the methyl group, and separating from the reaction product 1-pentachloroethyl-4-(trichloromethyl)-benzene.

5. In a method for the conversion of diisopropyl benzene to bis-(pentachloroethyl)-benzene, the step of reacting the diisopropyl benzene together with chlorine, the total amount of chlorine being in excess of that theoretically required to perchlorinate the alkyl substituents, in the presence of actinic light, at a reaction temperature between about 20 and 200 degrees centigrade, for a period of time in excess of about 30 hours and sufficient to cause chlorinolysis of the isopropyl groups to pentachloroethyl groups, and separating from the reaction product bis-(pentachloroethyl)-benzene.

6. The process of claim 1, wherein the reaction is continued for a period in excess of about 30 hours.

7. The process of claim 1, wherein the aromatic compound is reacted continuously with the chlorine for a period in excess of about 30 hours.

EARL T. McBEE.
OGDEN R. PIERCE.

REFERENCES CITED

The following references are of record in the file of this patent:

UNITED STATES PATENTS

| Number | Name | Date |
| --- | --- | --- |
| 1,146,142 | Ellis | July 13, 1915 |
| 1,828,858 | Conklin | Oct. 27, 1931 |

FOREIGN PATENTS

| Number | Country | Date |
| --- | --- | --- |
| 448,851 | Great Britain | June 10, 1936 |